Figure 1:
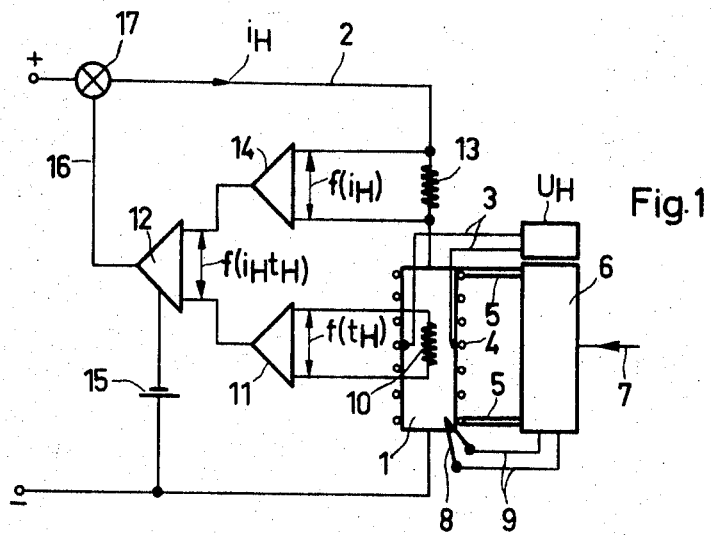

United States Patent

[11] 3,597,679

| | | |
|---|---|---|
| [72] | Inventor | Karleugen Habfast<br>Bremen, Germany |
| [21] | Appl. No. | 805,447 |
| [22] | Filed | Mar. 10, 1969 |
| [45] | Patented | Aug. 3, 1971 |
| [73] | Assignee | Varian Mat GmbH<br>Bremen, Germany |
| [32] | Priority | Mar. 13, 1968 |
| [33] | | Germany |
| [31] | | P 16 16 916.6 |

[54] DEVICE FOR MEASURING MAGNETIC FIELD STRENGTH USING A HALL PROBE AND COMPRISING MEANS FOR SUPPRESSING ALTERATIONS OF THE HALL VOLTAGE DUE TO TEMPERATURE FLUCTUATIONS
3 Claims, 2 Drawing Figs.

[52] U.S. Cl. .................................................... 324/45
[51] Int. Cl. ................................................ G01r 33/06
[50] Field of Search ............................... 324/45, 117 H, 46

[56] References Cited
UNITED STATES PATENTS

| 2,862,184 | 11/1958 | Longini .................. | 324/45 X |
|---|---|---|---|

FOREIGN PATENTS

| 859,296 | 1/1961 | Great Britain ............... | 324/45 |
| 908,683 | 10/1962 | Great Britain ............... | 324/45 |

Primary Examiner—Alfred E. Smith
Attorney—Wolf, Greenfield and Hieken

ABSTRACT: The invention provides a device for measuring magnetic field strength using a Hall probe and comprising means for suppressing alterations of the Hall voltage due to temperature fluctuations, said means comprising a thermal stabilization device for the Hall probe and a device for controlling the Hall current in such a way that the Hall voltage remains constant with a constant magnetic field.

PATENTED AUG 3 1971 3,597,679

Inventor:
Karl-Eugen Halfast
Wolf, Greenfield Hieken + Sacks.

DEVICE FOR MEASURING MAGNETIC FIELD STRENGTH USING A HALL PROBE AND COMPRISING MEANS FOR SUPPRESSING ALTERATIONS OF THE HALL VOLTAGE DUE TO TEMPERATURE FLUCTUATIONS

The invention relates to a device for measuring the magnetic field strength H of magnetic fields by means of a Hall probe, which is traversed by control current (Hall current $i_H$) and the output voltage of which (Hall voltage $u_H$) serves as a measure for the magnetic field strength, particularly for measuring the magnetic field strength in sectoral field mass spectrometers.

The Hall probe is one of the most convenient and sensitive measuring means for magnetic field strength, but it has the disadvantage that the measuring value is temperature dependent. The value of field strength H is determined by the equation $$H=(u_H/k \cdot i_H)$$

In this, $u_H$ is the Hall voltage which serves as a measure for the field strength, $k$ is the so-called Hall constant and $i_H$ is the Hall current.

The Hall constant $k$ is temperature dependent. Moreover, the internal resistance of the Hall probe, which determines the Hall current $i_H$ is temperature dependent. There is thus a temperature dependence of measuring value $u_H$ for the field strength in the form of a complicated nonlinear shape.

In order to exclude measurement errors due to temperature fluctuations, it is known to provide the measuring circuit with a constant-current control for the Hall current $i_H$, and moreover to use a thermal stabilization. By this means, an extensive exclusion of measuring inaccuracies due to temperature fluctuations can be achieved, but the degree of exclusion of measuring errors which can be reached is unsatisfactory with very high requirements on measuring accuracy.

It is an object of the invention to improve the measuring accuracy of field strength by means of Hall probes, beyond the extent hitherto reached.

In the solution of this problem, the invention proceeds from the consideration that thermal stabilization can generally only be performed down to a certain residual fluctuation of temperature, and takes place relatively sluggishly, and that the fluctuations of the measuring value, which remain with thermal stabilization have a temperature dependent course over a small region of the complicated temperature function, which can be approximated by a linear function, so that basically a compensation by an electrical control procedure would be possible.

Of the two factors of the measuring value, namely the Hall constant $k$ and the Hall current $i_H$, the Hall constant $k$ is not amenable to a control procedure. There remains thus only the possibility, when utilizing the Hall voltage $u_H$ as a measure for the field strength, of controlling the Hall current $i_H$ in dependence on residual temperature fluctuations, so that the produce $k \cdot i_H$ of the Hall constant and the Hall current remains unchanged with temperature fluctuations.

Proceeding from these considerations, the invention consists in a device for measuring the magnetic field strength of magnetic fields, comprising a Hall probe, means for supplying a control current to the Hall probe, means for utilizing the output voltage of the Hall probe as a measure for the magnetic field strength, more particularly for the measurement of magnetic field strengths in sectoral field mass spectrometers, and means for suppressing alterations of said output voltage caused by temperature fluctuations, said suppressing means comprising a device for thermal stabilization of the Hall probe, and a device for controlling the said control current, said controlling device comprising a measuring sensing device for the Hall probe temperature and the control characteristic of which is adjustable in such a manner that the said output voltage remains constant with alteration of the Hall probe temperature and with a constant magnetic field.

By the combination of these two measures, an essential improvement in measuring accuracy can be achieved.

Figure 2:
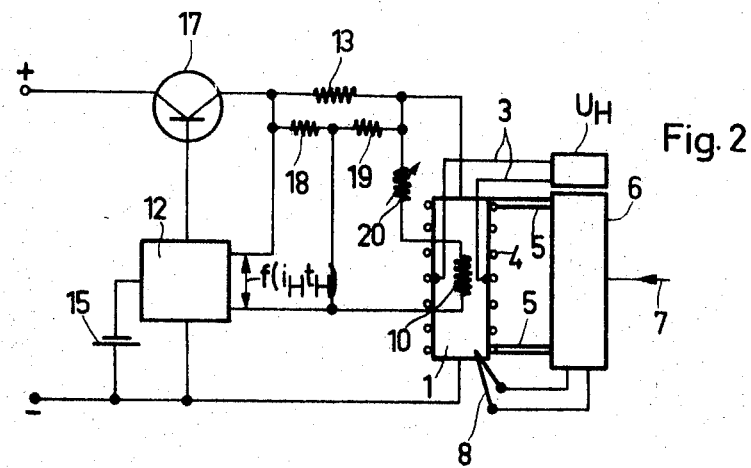

In order to make the invention clearly understood, reference will now be made to the accompanying drawings which are given by way of example and in which:

FIG. 1 is a circuit diagram of an arrangement according to the present invention; and FIG. 2 illustrates an embodiment of the circuit.

In the drawing, 1 is the Hall probe serving for the magnetic field measurement. The Hall probe lies in the current circuit 2 of a direct current source in which as a control current the so-called Hall current $i_H$ flows. At the Hall probe, through connections 3, the voltage which is dependent on the control current $i_H$ and the field strength H of the magnetic field in which the Hall probe is disposed, that is to say the so-called Hall voltage $u_H$ is measured, which serves as a measure for the magnetic field strength H.

The Hall probe is provided in the customary manner with thermal stabilizing, consisting of a cooling coil 4 which is connected to a cooling medium circulation system 5 with a control device 6. This control device, through a control line 7, has a parameter corresponding to the desired temperature fed to it in the form of suitable control signals. The actual temperature $t_H$ of the Hall probe is measured by a sensing device 8 and a parameter corresponding to the measured value is fed to the control device 6 through a line 9.

The same temperature sensing device 8 or separate temperature sensing device 10 on the Hall probe supplies the temperature measurement value $t_H$ for compensation of the temperature dependent fluctuations of the Hall voltage $u_H$, to an amplifier 11 and control circuit 12 for the temperature dependent control of the Hall current $i_H$. The same control circuit 12, for the control operation, moreover receives a control signal derived from the actual value of the Hall current $i_H$, from a resistance 13 and a control amplifier 14. A constant current source 15 is provided which supplies the desired value as a constant magnitude parameter to the control circuit 12. Thus, from the control circuit a control signal is fed to a line 16 to a setting member 17 for the Hall current $i_H$. The control signals derived from the temperature sensing device 10 and the Hall current actual value, are standardized in such a way that with alterations of the temperature $t_H$ of the Hall probe, the Hall current $i_H$ assumes changed values such that the product of the Hall current $i_H$ and the Hall constant $k$ remains unchanged.

In FIG. 2, another embodiment of the circuit according to FIG. 1 is illustrated. A voltage divider 18, 19 is connected in parallel to the resistance 13 for the actual value of the Hall current. The voltage at the resistance 18 serves as control value for the control circuit 12 whereas the resistance 19 of the voltage divider is disposed in the current circuit of the temperature sensing device 10 of the Hall probe. In this current circuit, furthermore a potentiometer 20 is provided by means of which the proportionality factor can be adjusted, with which the actual value of the Hall current is influenced on temperature fluctuations. A transistor is provided as the setting member 17.

Many modifications and other embodiments are possible. The expenditure for the thermal stabilization can be lower due to the electrical compensation of residual fluctuations by controlling the Hall current. Also, by the combined use of thermal stabilization and temperature dependent Hall current regulation, a considerably greater measuring accuracy can be achieved than with known devices. With the device of the invention, accuracy of magnetic field measurement of $10^{16}$ can be achieved.

I claim:

1. An apparatus for measuring the strength of a magnetic field comprising a Hall probe disposed in the magnetic field means for supplying a control current to the Hall probe, and means responsive to the output voltage of the Hall probe for providing a measure of the strength of the magnetic field, the improvement comprising means for maintaining the Hall probe within a predetermined temperature range, means for deriving a signal $f(i_H)$ that is a function of the control current to the Hall probe, means for providing a temperature signal $f(t_H)$ that is a function of the temperature of the Hall probe, and control means responsive to the $f(i_H)$ signal and the $f(t_H)$ signal, the control means causing the control current $i_H$ to the Hall probe to maintain the output voltage of the probe constant when the magnetic field is of constant strength.

2. The improvement according to claim 1, wherein, the means for providing the temperature signal $f(t_H)$ includes a sensor for sensing the temperature of the Hall probe and a first amplifier responsive to the output of the sensor, the output of the first amplifier being coupled to the control means the means for deriving the signal $f(i_H)$ includes a second amplifier, the output of the second amplifier being coupled to the control means, and the control means includes means for combining the $f(i_H)f(t_H)$ signal to provide a regulating signal to the means which supplies the control current to the Hall probe.

3. The improvement according to claim 1 wherein the control means includes means for combining the $f(i_H)$ signal and the $f(t_H)$ signal, the combining means comprising a first resistor through which the control current $i_H$ flows, a voltage divider shunting the first resistor, and means for applying the temperature signal $t_H$ across a portion of the voltage divider.